R. E. HELLMUND.
MAGNETIZABLE WEDGE FOR DYNAMO ELECTRIC MACHINES.
APPLICATION FILED AUG. 2, 1909.
1,024,572.
Patented Apr. 30, 1912.
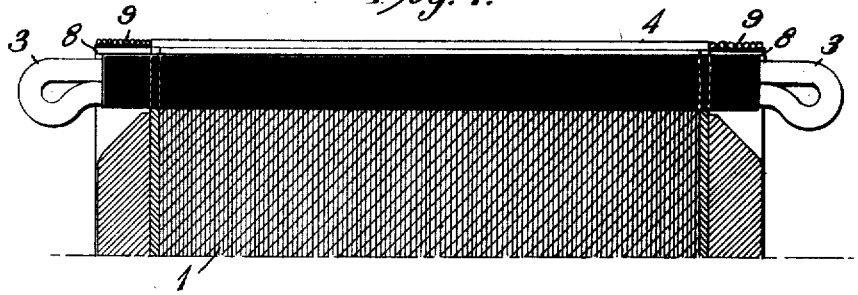
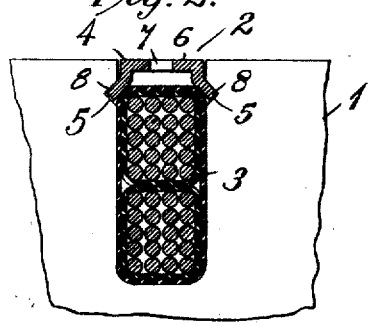
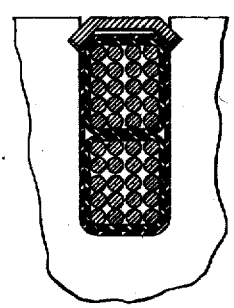  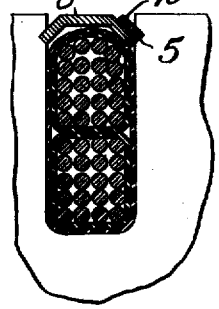
WITNESSES:
Fred H. Miller
INVENTOR
Rudolf E. Hellmund
BY
ATTORNEY

UNITED STATES PATENT OFFICE.

RUDOLF E. HELLMUND, OF PITTSBURGH, PENNSYLVANIA, ASSIGNOR TO WESTINGHOUSE ELECTRIC AND MANUFACTURING COMPANY, A CORPORATION OF PENNSYLVANIA.

MAGNETIZABLE WEDGE FOR DYNAMO-ELECTRIC MACHINES.

1,024,572.  Specification of Letters Patent.  Patented Apr. 30, 1912.

Application filed August 2, 1909. Serial No. 510,839.

*To all whom it may concern:*

Be it known that I, RUDOLF E. HELLMUND, a subject of the Emperor of Germany, and a resident of Pittsburgh, in the county of Allegheny and State of Pennsylvania, have invented a new and useful Improvement in Magnetizable Wedges for Dynamo-Electric Machines, of which the following is a specification.

My invention relates to dynamo-electric machines having magnetizable core members provided with open slots for the reception of coils and it has for its object to provide a magnetizable wedge which shall be simple in construction and adapted to securely hold the coils in the slots in opposition to centrifugal and magnetic forces tending to displace them and also substantially produce the operating characteristics of partially-closed-slot machines.

The magnetizable wedge of my present invention is particularly adapted for use with induction motors having wound secondaries that are operated at high speeds and the core members of which are provided with a large number of relatively small slots for the reception of the windings. It is evident to those skilled in the art that it is particularly difficult to provide magnetizable wedges which will successfully perform their functions when made in very small sizes and utilized with induction motors having very small air gaps, since the magnetic forces tending to displace the wedges are very great.

According to my present invention, I extend the wedges beyond the ends of the core slots and wind a number of convolutions of steel band wire upon the projecting ends for the purpose of holding them securely in position.

Figure 1 of the accompanying drawings is a sectional elevation of a portion of the core member of a dynamo-electric machine which is equipped with my invention. Fig. 2 is a sectional elevation, at right angles to that of Fig. 1, showing a single slot, the coil being shown in position. Fig. 3 is a detail view of the wedge shown in Figs. 1 and 2, and Figs. 4, 5 and 6 are views corresponding to Fig. 2 but showing modified wedge structures which embody my invention.

Referring to Figs. 1, 2 and 3 of the drawings, a magnetizable core member 1 of a dynamo-electric machine, having radial core-slots 2, is provided with a winding 3 which is partially located in the slots 2 and is held in position by magnetizable wedges 4. The slots are of the open type and their side walls are provided with grooves 5 to receive the wedges 4. Each of the wedges is composed of a central strip 6 having longitudinal slots 7 cut in it and side pieces 8 which are integral with the central strip and form lateral projections. The central strip corresponds in length to the slots 2, but the projections 8 extend materially beyond the ends of the central strip so that they are adapted to receive a plurality of convolutions 9 of band wire for the purpose of holding the wedges securely in position after they have been assembled in the core slots, as shown in Fig. 1 of the drawings. If the longitudinal slots 7 were omitted, the harmful magnetic flux across the slots would be greatly increased, whereas, when they are present, the operating characteristics of a partially-closed-slot machine are approximated.

The band wire may be replaced by rings, within the scope of my invention.

Referring to Figs. 4, 5 and 6 of the drawings, the wedge shown in Fig. 4 is similar to that shown in Fig. 2 except that the cross sectional form is slightly modified. In Fig. 6, the magnetizable wedge is similar to that of Fig. 4, but an angle strip 10 of non-magnetic material is located between the projection 8 of the wedge and the groove 5. In Fig. 5, a magnetizable strip 11 is riveted to a non-magnetizable strip 12 which constitutes the usual wedge for holding the coils in the slot while the strip 11 serves to improve the characteristics of the machine. The ends of the magnetizable portions of the wedges shown in Figs. 4, 5 and 6 are preferably extended to correspond to the wedge shown in Fig. 1.

I desire that variations in size and structure which do not depart from the spirit of my invention shall be included within its scope.

I claim as my invention:

1. The combination with a core member of a dynamo-electric machine having core slots for the reception of coils, of magnetizable wedges located in the openings of the slots and having laterally projecting side pieces of greater length than the body portions that project beyond the ends of the core slot, and bands for holding the wedges in position.

2. In a dynamo-electric machine, the combination with a magnetizable core member having a plurality of coil-containing slots, of wedges for holding the coils in position each of which comprises a magnetizable strip having side pieces the ends of which project beyond the body portions and the ends of the core slots, and bands surrounding the projecting ends of the wedges for preventing their displacement.

3. In a dynamo-electric machine, the combination with a magnetizable core member having teeth which form slots for the reception of coils and are provided with grooves in their sides and adjacent to their free ends, of wedges for holding the coils in position in the slots each of which comprises a magnetizable strip having centrally located longitudinal slots and side pieces projecting beyond the core member, and a plurality of convolutions of band wire surrounding the projecting ends of the side pieces for preventing their displacement.

In testimony whereof, I have hereunto subscribed my name this 28th day of July, 1909.

RUDOLF E. HELLMUND.

Witnesses:
CHARLES W. McGHEE,
R. J. DEARBORN.